United States Patent [19]

Sawada

[11] Patent Number: 4,806,920

[45] Date of Patent: Feb. 21, 1989

[54] DEVICE FOR PRODUCING AN OUTPUT IMAGE WHILE GIVING AN ORIGINAL IMAGE A ROTATION OF 90, 180, OR 270

[75] Inventor: Hachiro Sawada, Tokyo, Japan

[73] Assignee: NEC Corporation, Tokyo, Japan

[21] Appl. No.: 31,623

[22] Filed: Mar. 30, 1987

[30] Foreign Application Priority Data

Mar. 28, 1986 [JP] Japan ................................. 61-68756
Aug. 29, 1986 [JP] Japan ................................. 61-201238
Feb. 21, 1987 [JP] Japan ................................. 62-36895

[51] Int. Cl.$^4$ ............................................. G09G 1/06
[52] U.S. Cl. ................................................... 340/727
[58] Field of Search ............... 340/720, 723, 724, 727, 340/789, 798, 799; 382/44, 46, 47

[56] References Cited

U.S. PATENT DOCUMENTS

| | | | |
|---|---|---|---|
| 3,976,982 | 8/1976 | Eiselen | 382/46 |
| 4,168,488 | 9/1979 | Evans | 340/799 |
| 4,271,476 | 6/1981 | Lotspiech | 340/727 |
| 4,527,155 | 7/1985 | Yamaki et al. | 340/727 |
| 4,566,002 | 1/1986 | Miura et al. | 340/727 |
| 4,593,407 | 6/1986 | Konishi et al. | 382/46 |
| 4,636,783 | 1/1987 | Omachi | 340/724 |
| 4,656,664 | 4/1987 | Anderson et al. | 382/47 |
| 4,703,515 | 10/1987 | Baroody, Jr. | 340/727 |
| 4,706,205 | 11/1987 | Akai et al. | 340/727 |

Primary Examiner—Gerald L. Brigance
Assistant Examiner—Richard Hjerpe
Attorney, Agent, or Firm—Sughrue, Mion, Zinn, Macpeak, and Seas

[57] ABSTRACT

In an image rotating device, an input data processor processes an input signal representative of an original image into a processed signal successively representative of words wherein bits representative of picture elements of the original image are arranged according to an angle of rotation of 90°, 180°, or 270° which should be given to the original image. When the rotation is 90° or 270°, a block of bits is set in a shift register array which successively produces groups of bits. The groups of bits are stored in a random access memory and then read therefrom as successive group sets in a predetermined manner. An output data processor processes the group sets into an output signal representative of a desired rotated output image. When the rotation is 180°, the processed signal is processed by the output data processor directly into the output signal. Preferably, a prescribed number of shift register arrays are used to successively produce the groups, each having a longer bit length than the group produced by a single shift register array.

6 Claims, 12 Drawing Sheets

|   |   |   |   |
|---|---|---|---|
| | | ---- (B1)1 (B0)1 (A15)1 (A14)1 ---- (A1)1 (A0)1<br>---- (B1)2 (B0)2 (A15)2 (A14)2 ---- (A1)2 (A0)2<br><br>---- (B1)8 (B0)8 (A15)8 (A14)8 ---- (A1)8 (A0)8 | |
| | | ---- (D1)1 (D0)1 (C15)1 (C14)1 ---- (C1)1 (C0)1<br>---- (D1)2 (D0)2 (C15)2 (C14)2 ---- (C1)2 (C0)2 | |
| | | | |

|   |   |   |
|---|---|---|
| (A0)1 (A0)2 ---- (A0)8<br>(A1)1 (A1)2 ---- (A1)8<br><br>(A14)1 (A14)2 ---- (A14)8<br>(A15)1 (A15)2 ---- (A15)8 | (C0)1 (C0)2 ----<br>(C1)1 (C1)2 ----<br><br>(C14)1 (C14)2 ----<br>(C15)1 (C15)2 ---- | |
| (B0)1 (B0)2 ---- (B0)8<br>(B1)1 (B1)2 ---- (B1)8 | (D0)1 (D0)2 ----<br>(D1)1 (D1)2 ---- | |
| | | |

FIG 7

| | | |
|---|---|---|
| 1 | 0 | 16 |
| 2 | 32 | 48 |
| 3 | 64 | 80 |
| --- | --- | --- |
| k+1 | 1 | 17 |
| k+2 | 33 | 49 |
| --- | --- | --- |
| 15k+1 | 15 | 31 |
| 15k+2 | 47 | 63 |
| --- | --- | --- |

FIG 8

| | | | | | |
|---|---|---|---|---|---|
| 1 | (A0)1 | (A0)2 | ----- | (A0)8 | (C0)1 (C0)2 ----- (C0)8 |
| 2 | | | | | |
| 3 | | | | | |
| --- | | | | | |
| k+1 | (A1)1 (A1)2 | ----- | (A1)8 | (C1)1 (C1)2 | ----- (C1)8 |
| k+2 | | | | | |
| --- | | | | | |
| 15k+1 | (A15)1 (A15)2 | ----- | (A15)8 | (C15)1 (C15)2 | ----- (C15)8 |
| 15k+2 | | | | | |
| --- | | | | | |

|   |   | --- | B1 | B0 | A15 | --- | A1 | A0 |
|---|---|---|---|---|---|---|---|---|
|   |   | --- | D1 | D0 | C15 | --- | C1 | C0 |
|   |   | --- | F1 | F0 | E15 | --- | E1 | E0 |
|   |   | --- | H1 | H0 | G15 | --- | G1 | G0 |
|   |   |   |   |   |   |   |   |   |

| A0 | C0 | E0 | G0 |   |
|---|---|---|---|---|
| A1 | C1 | E1 | G1 |   |
| ⋮ | ⋮ | ⋮ | ⋮ | --- |
| A15 | C15 | E15 | G15 |   |
| B0 | D0 | F0 | H0 |   |
| B1 | D1 | F1 | H1 |   |
| ⋮ | ⋮ | ⋮ | ⋮ |   |
|   |   |   |   |   |

FIG 14

|       | 1  | 2  | 3  | 4  |
|-------|----|----|----|----|
| 1     | 0  | 0  | 32 | 32 |
| 2     | 64 | 64 | 96 | 96 |
| ⋮     | ⋮  | ⋮  | ⋮  | ⋮  |
| k+1   | 1  | 1  | 33 | 33 |
| k+2   | 65 | 65 | 97 | 97 |
| ⋮     | ⋮  | ⋮  | ⋮  | ⋮  |
| 16k+1 | 16 | 16 | 48 | 48 |
| 16k+2 | 80 | 80 | 112| 112|
| ⋮     | ⋮  | ⋮  | ⋮  | ⋮  |

FIG 15

|       | 1    | 2    | 3    | 4    |
|-------|------|------|------|------|
| 1     | RAM1 | RAM2 | RAM1 | RAM2 |
| 2     | RAM1 | RAM2 | RAM1 | RAM2 |
| ⋮     | ⋮    | ⋮    | ⋮    | ⋮    |
| k+1   | RAM1 | RAM2 | RAM1 | RAM2 |
| k+2   | RAM1 | RAM2 | RAM1 | RAM2 |
| ⋮     | ⋮    | ⋮    | ⋮    | ⋮    |
| 16k+1 | RAM2 | RAM1 | RAM2 | RAM1 |
| 16k+2 | RAM2 | RAM1 | RAM2 | RAM1 |
| ⋮     | ⋮    | ⋮    | ⋮    | ⋮    |

FIG 16

|       | 1  | 2  | 3  | 4  |
|-------|----|----|----|----|
| 1     | A0 | C0 | E0 | G0 |
| 2     |    |    |    |    |
| ⋮     | ⋮  | ⋮  | ⋮  | ⋮  |
| k+1   | A1 | C1 | E1 | G1 |
| k+2   |    |    |    |    |
| ⋮     | ⋮  | ⋮  | ⋮  | ⋮  |
| 16k+1 | B0 | D0 | F0 | H0 |
| 16k+2 |    |    |    |    |
| ⋮     | ⋮  | ⋮  | ⋮  | ⋮  |

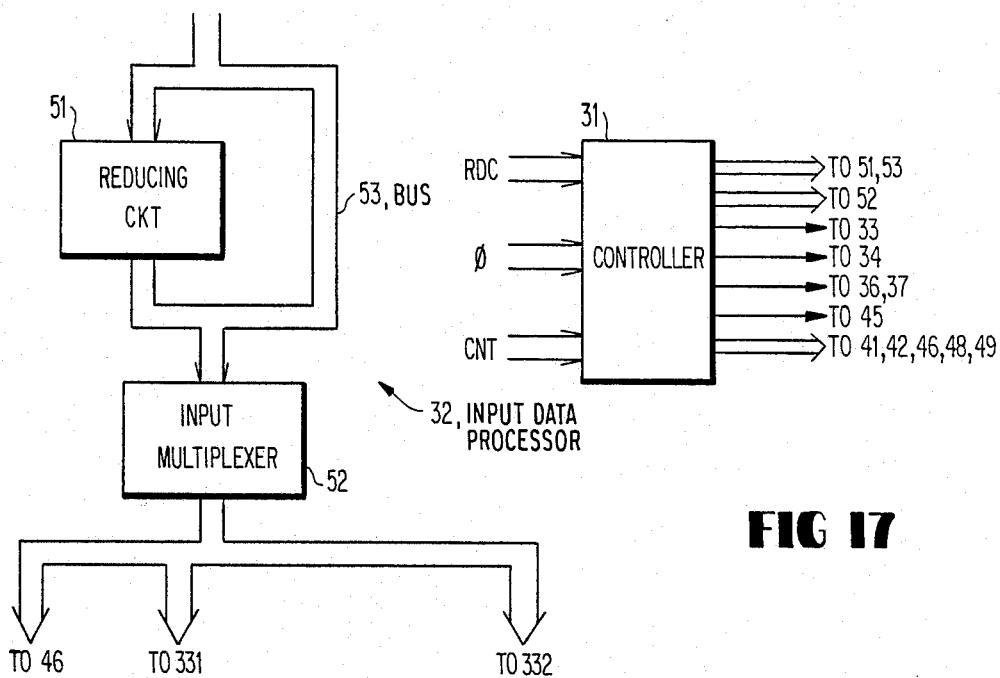

|  |  | ---- (B2)0 (B0)0 | (A30)0 (A28)0 | ---- | (A2)0 (A0)0 |
|  |  | ---- (B2)2 (B0)2 | (A30)2 (A28)2 | ---- | (A2)2 (A0)2 |
|  |  | ---- (B2)14 (B0)14 | (A30)14 (A28)14 | ---- | (A2)14 (A0)14 |
|  |  | ---- (D2)0 (D0)0 | (C30)0 (C28)0 | ---- | (C2)0 (C0)0 |
|  |  | ---- (D2)2 (D0)2 | (C30)2 (C28)2 | ---- | (C2)2 (C0)2 |
|  |  |  |  |  |  |

FIG 19

| A30' A28' |  | A4' A2' A0' |
|---|---|---|
| (A30)0 (A28)0 | ----- | (A4)0 (A2)0 (A0)0 |
| (A30)2 (A28)2 | ----- | (A4)2 (A2)2 (A0)2 |
| (A30)4 (A28)4 | ----- | (A4)4 (A2)4 (A0)4 |
| ---- |  |  |
| (A30)14 (A28)14 | ----- | (A4)14 (A2)14 (A0)14 |

FIG 20

|  | B1 | B0 | A31 | A30 |  | A3 | A2 | A1 | A0 |
|---|---|---|---|---|---|---|---|---|---|
| ---- | D1 | D0 | C31 | C30 | ---- | C3 | C2 | C1 | C0 |
| ---- | F1 | F0 | E31 | E30 | ---- | E3 | E2 | E1 | E0 |
| ---- | H1 | H0 | G31 | G30 | ---- | G3 | G2 | G1 | G0 |
|  |  |  |  |  |  |  |  |  |  |

FIG 21

|  | B0' | A30' |  | A2' | A0' |
|---|---|---|---|---|---|
| ---- | D0' | C30' | ---- | C2' | C0' |
| ---- | F0' | E30' | ---- | E2' | E0' |
| ---- | H0' | G30' | ---- | G2' | G0' |
|  |  |  |  |  |  |

| | 362 ADDRESS SECTION | | | | | | | | | | | | | | |
|---|---|---|---|---|---|---|---|---|---|---|---|---|---|---|---|
| C0' | C2' | --- | C30' | B0' | B2' | --- | B30' | G0' | G2' | --- | G30' | F0' | F2' | --- | F30' | --- |

| ADDRESS SECTION 361 | | | | | | | | | | | | | | | |
|---|---|---|---|---|---|---|---|---|---|---|---|---|---|---|---|
| A0' | A2' | --- | A30' | D0' | D2' | --- | D30' | E0' | E2' | --- | E30' | H0' | H2' | --- | H30' | --- |
| 0 | 1 | --- | 15 | 16 | 17 | --- | 31 | 32 | 33 | --- | 47 | 48 | 49 | --- | 63 | --- |

FIG 23

| A0' | A2' | --- | A30' | B0' | B2' | --- |
|---|---|---|---|---|---|---|
| C0' | C2' | --- | C30' | D0' | D2' | --- |
| E0' | E2' | --- | E30' | F0' | F2' | --- |
| G0' | G2' | --- | G30' | H0' | H2' | --- |
| --- | --- | | --- | --- | --- | --- |

DEVICE FOR PRODUCING AN OUTPUT IMAGE WHILE GIVING AN ORIGINAL IMAGE A ROTATION OF 90, 180, OR 270

BACKGROUND OF THE INVENTION

This invention relates to a device for giving an original image or pattern a rotation of 90°, 180°, or 270° to provide an output image. An image rotating device of this type is useful, for example, in rotating a scene or part of a scene to be displayed on a cathode-ray tube.

An image rotating device is disclosed in U.S. Pat. No. 4,636,783 issued to Takao Omachi and assigned to the present assignee. According to the Omachi patent, an input signal representative of the original image is processed into an output signal representative of the output image with the original image divided into blocks and with the original image processed on a block by block basis. Each block consists of a first predetermined number of words, each word consisting of a second predetermined number of bits representative of picture elements of the original image. The image rotating device of the Omachi patent is compact and is capable of carrying out the rotation in a very short interval of time. The image rotating device is, however, incapable of producing the output image while giving the rotation to the original image.

SUMMARY OF THE INVENTION

It is therefore an object of the present invention to provide an image rotating device capable of producing an output image while giving an original image a rotation of 90°, 180°, or 270°.

Other objects of this invention will become clear as the description proceeds.

According to this invention, there is provided a device responsive to an angle signal indicative of a preselected angle selected from 90°, 180°, and 270° for processing an input signal representative of an original image into an output signal representative of an output image which corresponds to the original image rotated by the preselected angle. The device comprises a controller responsive to the angle signal for producing a control signal and a timing signal; an input data processing circuit responsive to the control and the timing signlas for processing the input signal into a processed signal; shift register means responsive to the timing signal for shifting the processed signal to produce a first rotated signal; memory means responsive to the timing signal for memorizing the first rotated signal and for producing a second rotated signal; and an output data processing circuit responsive to the control and the timing signals for processing one of the processed signal and the second rotated signal into the output signal, the last-mentioned one of the processed signal and the second rotated signal being the second rotated signal when the preselected angle is one of 90° and 270°, the last-mentioned one of the processed signal and the second rotated signal being the processed signal when the preselected angle is 180°.

BRIEF DESCRIPTION OF THE DRAWING

FIG. 2 schematically shows an original image;

FIG. 3 schematically shows an output image;

FIG. 7 shows an address scheme used in accessing the random access memory mentioned in conjunction with FIG. 6;

FIG. 8 shows picture element group sets which are successively represented by a second rotated signal;

FIG. 10 schematically shows the original image with simplified notations;

FIG. 11 schematically shows the output image with the simplified notations;

FIG. 14 shows an address scheme used in accessing the address sections mentioned in connection with FIG. 13;

FIG. 15 shows operaton of a data multiplexer used in the device illustrated in FIG. 9;

FIG. 16 shows picture element group sets successively represented by a second rotated signal;

FIG. 17 is a partial block diagram of an image rotating device according to a third embodiment of this invention;

FIG. 18 schematically shows an original image together with a first set of simplified notations;

FIG. 19 shows, schematically on an enlarged scale, an input image which the original image of FIG. 18 is reduced in size;

FIG. 20 shows, together with a second set of simplified notations, a picture element block which is memorized at a time in a shift register array used in the device of FIG. 17;

FIG. 21 schematically shows the original image of FIG. 18 with the first set of simplified notations;

FIG. 22 shows the input image on a somewhat enlarged scale and with the second set of simplified notations;

FIG. 23 schematically shows an output image which is produced by the device depicted in FIG. 17; and FIG. 24 shows picture element groups which are memorized in first and second address sections of a random access memory used in the device illustrated in FIG. 17.

DESCRIPTION OF THE PREFERRED EMBODIMENTS

Figure 1:
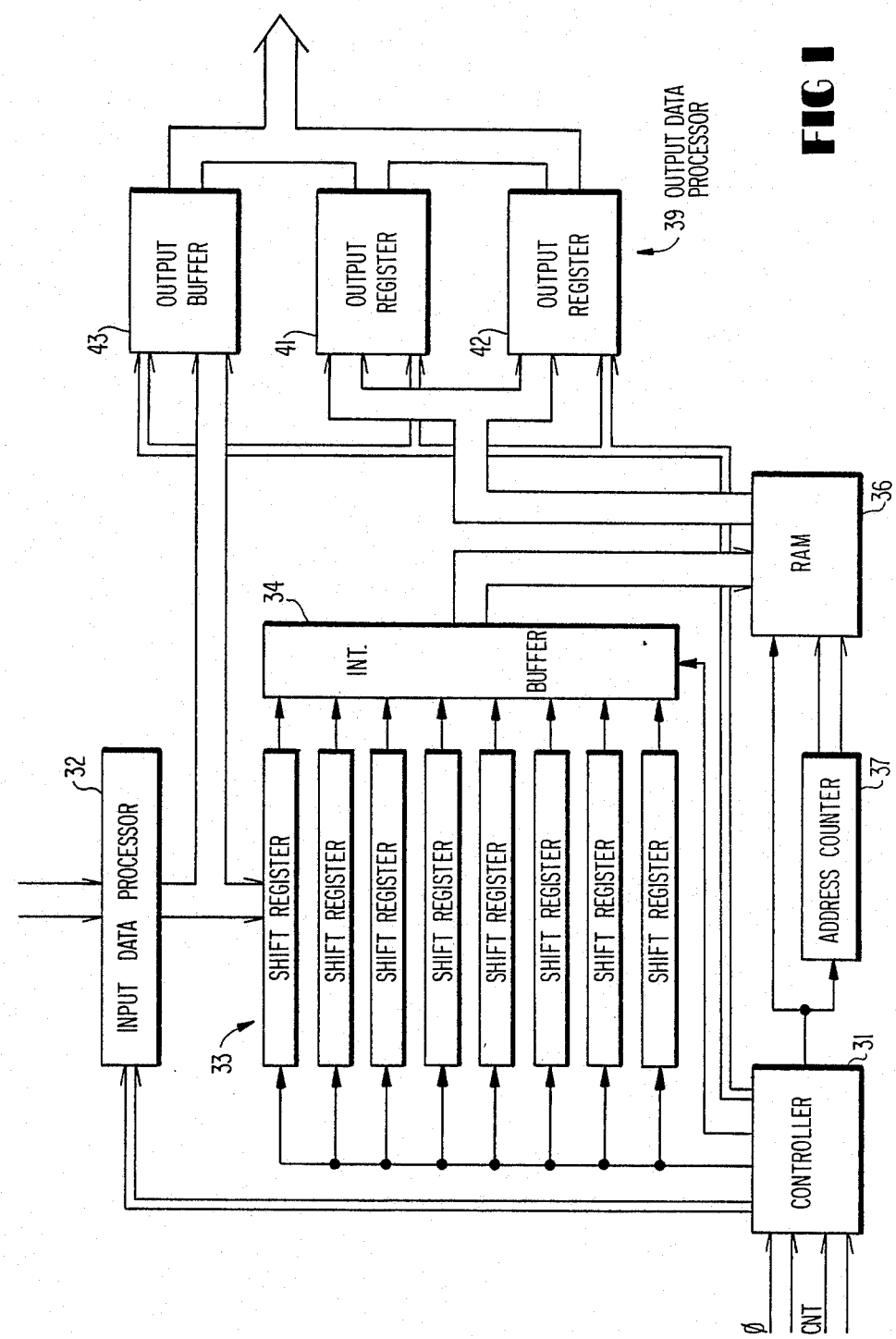
FIG. 1 is a block diagram of an image rotating device according to a first embodiment of the instant invention.

Referring to FIG. 1, an image rotating device according to a first embodiment of the present invention will be described A controller 31 is supplied with an angle signal $\phi$ indicative of a preselected angle which is selected from 90°, 180°, and 270°. The device is for processing an original image or pattern into an output image which is congruent with the original image given a rotation of the preselected angle. In the manner which will later become clear, the controller 31 produces a control signal and a timing signal and may furthermore be supplied with a control input CNT. The control signal indicates the preselected angle among others.

Turning to FIG. 2 for a short while, the original image is represented by a great number of picture elements or dots in a manner known in the art. It is possible without loss of generality to understand that the picture elements are arranged two-dimensionally in a matrix fashion along lines and columns of a matrix. The original image is therefore represented by picture elements of first through N-th lines and of first through M-th columns. In the manner described in the Omachi patent referred to hereinabove, the original image is divisible into a plurality of blocks indicated by thick lines.

Throughout the following, it will be assumed merely for simplicity of description that the original image is a black and white image. In this event, an image signal representative of the original image is a time sequence of binary bits representative of the respective picture elements. The word "bit" will therefore be used instead of the expression "picture element" and vice versa.

Each of the above-mentioned blocks may consist of a first predetermined number of words n, each consisting of a second predetermined number of bits m. In short, each block consists of nm-bit words. For brevity of description which follows, it will be presumed that the numbers M and N are integral multiples of the first and second predetermined numbers. Unless otherwise indicated, attention will be directed to a numerical example such that each block consists of eight sixteen-bit words.

The picture elements or the bits will be designated by reference signals exemplified along the (M-17)-th through the M-th columns and along the first through the tenth lines. It will be seen that the alphabets are used in identifying the blocks and that numerals are attached to pairs of parentheses to indicate first through eighth words of each block. Within the parenthesis pairs, the bits are identified by numerals suffixed to the alphabets in a reverse order relative to the time sequence of the binary bits. This is merely for convenience of illustration as will presently become clear. Each word will be represented with the picture elements thereof enclosed with a pair of brackets.

For supply to the image rotating device being illustrated, the image signal is converted to a bit-parallel input signal which represents the words from time to time. More particularly, the input signal represents sixteen bits at a time. Referring to the numerical example, the input signal successively represents the words [(A15)1, (A14)1, ..., (A1)1, (A0)1], [(A15)2, (A14)2, ..., (A1)2, (A0)2], ..., [(A15)8, (A14)8, ..., (A1)8, (A0)8], [(C15)1, (C14)1, ..., (C1)1, (C0)1], ..., [..., (B1)1, (B0)1], and so forth. Conversion of the image signal to the input signal is out of the scope of this invention and will not be described in detail. Only the fact may be pointed out in this connection that the conversion may be carried out by using either a frame memory or a central processing unit.

Further turning to FIG. 3, it will be surmised at first that the original image should be given a counterclockwise rotation of 90°. In other words, the picture elements should be arranged in the output image in the manner indicated in the figure by the reference symbols. For brevity of description, the word "counterclockwise" will often be omitted in the following.

Turning back to FIG. 1, an input data processing circuit 32 is supplied with the input signal to process the input signal into a processed signal in response to the control signal and the timing signal which are also supplied thereto. When the control signal indicates the 90° rotation as surmised heretofore, the processed signal successively represents the words of the original image in timed relation to the timing signal. The processed signal is therefore a bit-parallel signal which represents m or sixteen bits at a time or which has a bit length of m or sixteen bits.

A shift register assembly 33 consists of a single array of eight sixteen-stage shift registers. In the example being illustrated, each block is set in the shift register array or assembly 33 at a certain time instant with the bits of each word simultaneously set in one of the shift registers. After being set in this manner, the bits of the word are shifted through the respective shift registers with the timing signal used to provide shift pulses. The shift register array 33 thereby shifts the processed signal to deliver a shifted signal to an intermediate buffer 34. Each shift register will be said to have a bit length of m or sixteen.

Figures 4, 5, 6:
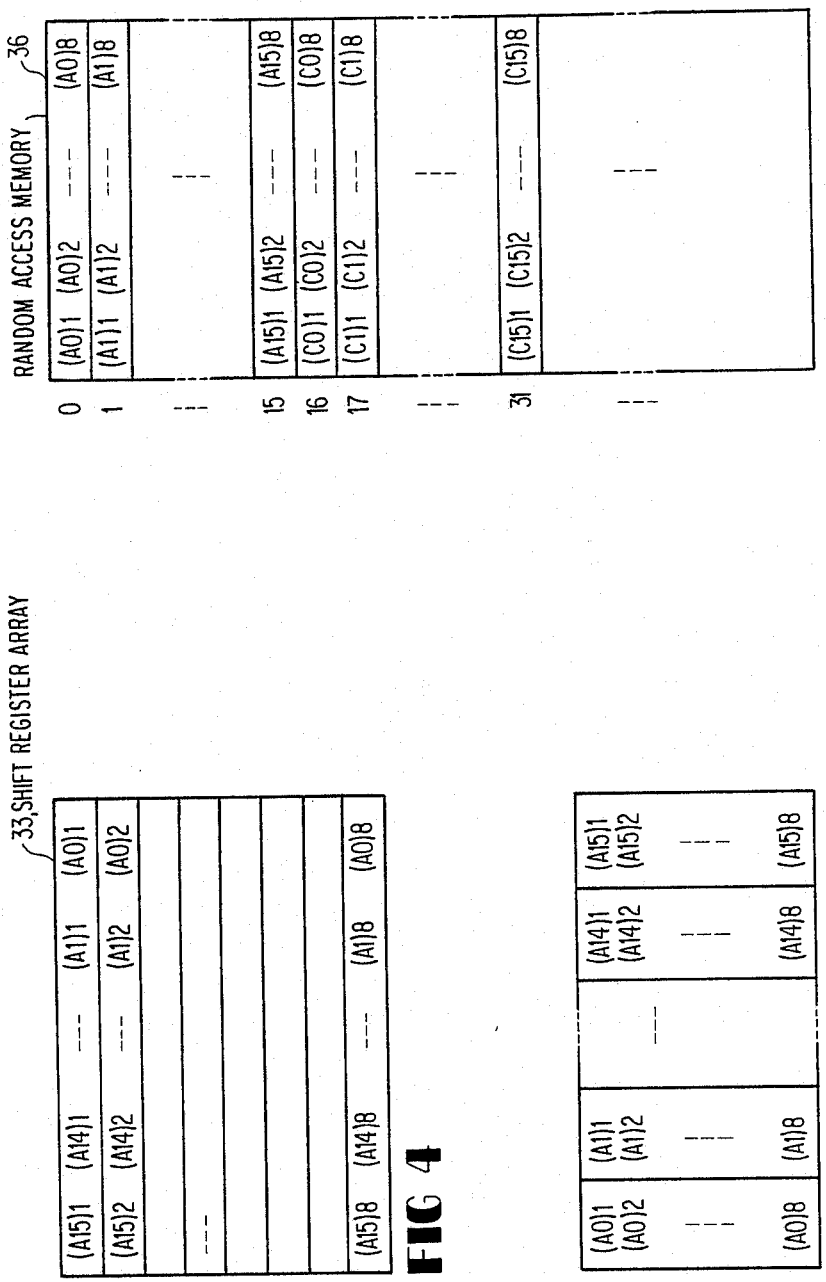
FIG. 4 shows a picture element block whihc is memorized at a time in a shift register array used in the device illustrated in FIG. 1.
FIG. 5 exemplifies picture element groups which are successively represented by a first rotated signal.
FIG. 6 shows picture element groups which are memorized in a random access memory used in the device of FIG. 1.

Turning temporarily to FIGS. 4 and 5, each block is set in the shift register array 33 in the manner exemplified in FIG. 4. The shifted signal represents n or eight bits at a time as group of bits. More specifically, the shifted signal successively represents such groups of bits as exemplified in FIG. 5, such as the groups [(A0)1, (A0)2, ..., (A0)8] and [(A1)1, (A1)2, ..., (A1)8]. In this manner, the shifted signal represents parts of the output image and is therefore referred to herein as a first rotated signal.

Referring to FIGS. 1 and 6, a random access memory 36 has a single address or memory section of zeroth, first, and consecutively numbered addresses 0, 1, ..., 15, 16, ..., 31, and others and is supplied with the first rotated signal through the intermediate buffer 34. Each address is for n or eight bits of the first rotated signal. Responsive to the timing signal, an address counter 37 produces an address signal which successively counts up at first and is used in accessing the respective addresses of the random access memory 36. In the meantime, the control signal is used to put the random access memory 36 in a write-in mode of operation. The groups of bits are stored in the respective addresses in the manner illustrated in FIG. 6.

Let it be assumed for the time beig that the random access memory 36 has at least MN/n addresses. When the address counter 37 counts up from zero up to (MN/n−1), the address counter 37 is switched to make the address signal successively indicate the addresses of the random access memory 36 in the manner which will be described in the following. The control signal is used so as to switch the address counter 37 and furthermore to switch the random access memory 36 into the read-out mode of operation.

Referring to FIGS. 1, 7, and 8, the address signal simultaneously indicates a preselected number of addresses at a time as a set of addresses after the address counter 37 is switched. In the example depicted in FIG. 7, the preselected number is equal to two. At time instants 1, 2, ..., (k+1), (k+2), ..., (15k+1), (15k+2), and so on, where k represents N/n, the sets of addresses are (0, 16), (32, 48), ..., (1, 17), (33, 49), ..., (15, 31), (47, 63), ... as shown in FIG. 7. It is therefore possible to say that the address counter 37 is switched to have a count width which is equal to the bit length of each shift register of the shift register assembly 33, namely, the bit length of the processed signal. The random access memory 36 produces a memory output signal which successively represents sets of bit groups at the respective time instants in the manner depicted in FIG. 8. As described in conjunction with the first rotated signal, the memory output signal is herein termed a second rotated signal.

In FIG. 1, an output data processing circuit 39 comprises first and second output registers 41 and 42 and an output buffer 43. Responsive to the control signal indicative of the 90° rotation, the output registers 41 and 42 are selected. The output buffer 43 is put out of operation. Controlled by the timing signal, the output registers 41 and 42 are used to temporarily store successive sets of the bit groups which are represented by the second rotated signal. The output registers 41 and 42 produce the above-mentioned output signal.

It will be surmised in the second place that the original image should be given a counterclockwise rotation of 270°. Controlled by the control signal indicative of the 270° rotation, the input data processing circuit 32 reverses the order of bits in each word. The processed signal therefore represents an order-reversed word at a time, such as [(AO)1, (A1)1, ..., (A14)1, (A15)1]. The first and the second output registers 41 and 42 are selected to produce the output signal representative of an output image which is congruent with the input image rotated by 270°.

It will be surmised in the third place that the original image should be given a rotation of 180°. Controlled by the control signal indicative of the 180° rotation, the input data processing circuit 32 makes the processed siganl represent the order-reversed words. The output buffer 43 is selected with the first and the second output registers 41 and 42 put into an inopertive state. The output buffer 43 produces the output signal representative of an output image which is congruent with the original image rotated by 180°.

Summarizing the description related to FIGS. 1 through 8, let it be assumed that the original image is that depicted in FIG. 2, where each block consists of eight sixteen-bit words. The angle signal ° indicates a rotation of one of 90°, 180°, and 270° at a time. When 90° is indicated, the input data processing circuit 32 makes the processed signal successively represent the words. Each block is set in the shift register assembly 33 in the manner exemplified in FIG. 4 and thereafter is shifted to produce the "first rotated" signal which represents a "group" of eight bits at a time as depicted in FIG. 5 for sixteen time units. In the meantime, the address counter 37 is used to successively indicate the addresses of the random access memory 36 in the manner depicted in FIG. 6. Subsequently, the address counter 37 is used to simultaneously indicate two addresses at a time as a set of addresses to make the random access memory 36 produce the "second rotated" signal as depicted in FIG. 8. Comparison of FIG. 8 with FIG. 3 will show that the second rotated signal partly represents the output image. Supplied with the second rotated signal, the output registers 41 and 42 produce the output signal representative of the output image. When 180° is indicated, the input data processing circuit 32 makes the processed signal represent the input image in an order-reversed fashion. Supplied with the processed signal directly from the input data processing circuit 32, the output buffer 43 produces the output signal. When 270° is indicated, the input data processing circuit 32 again makes the processed signal represent the input image in order-reversed fashion. Such order-reversed words are processed into the first rotated signal and then into the second rotated signal as previously described, in response to which the output registers 41 and 42 produce the output signal.

Figure 9:
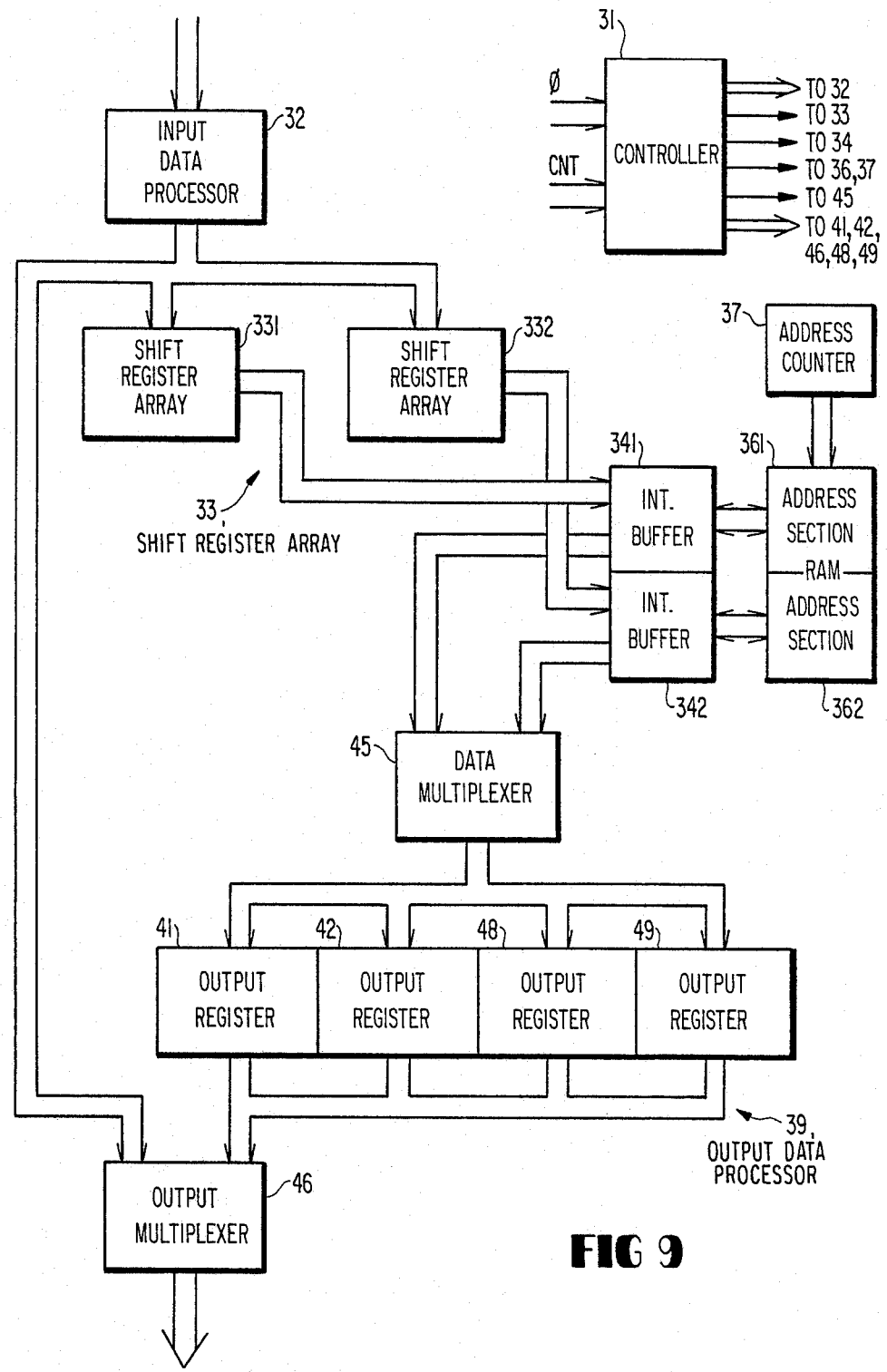
FIG. 9 is a block diagram of an image rotating device according to a second embodiment of this invention.

Referring now to FIG. 9, description will proceed to an image rotating device according to a second embodiment of this invention. The image rotating device comprises similar parts which are designated by like reference numerals. It should be noted in this respect that the shift register assembly 33 consists of first and second shift register arrays 331 and 332. Each shift register array 331 or 332 is similar in structure to the shift register assembly or array 33 described in connection with FIG. 1. In correspondence to such a prescribed number of shift register arrays, such as 331 and 332, other parts of the device are modified in the manner which will later be described.

Turning temporarily to FIGS. 10 and 11, a set of simplified notations will be used for the groups of bits or picture elements dealt with in the image rotating device being illustrated. It is possible in this event to represent the original and the output images in the manner illustrated when the original image is rotated 90° counterclockwise. The blocks will be designated by the alphabets as before.

Figure 12:
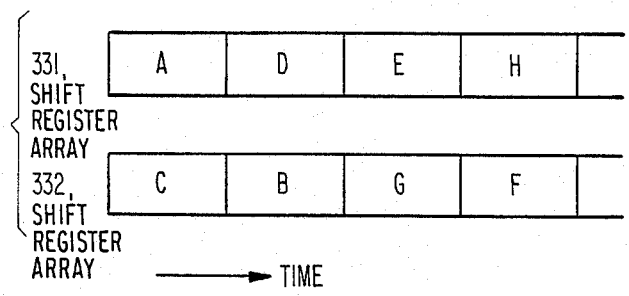
FIG. 12 shows picture element blocks which are memorized from time to time in first and second shift register arrays used in the device illustrated in FIG. 9.

Further turning to FIG. 12, the blocks of the processed signal are set from time to time in the first and the second shift register arrays 331 and 332 in the manner shown. For this purpose, the input data processing circuit 32 of FIG. 9 is controlled by the control signal and the timing signal to produce the processed signal which has a bit length of thirty-two, namely, twice the bit length of each shift register, and which alternately represents the blocks A and C, D and B, E and G, H and F, and so forth for storage in the first and the second shift register arrays 331 and 332. The shift register arrays 331 and 332 are used in this manner merely by way of example and collectively produce the first rotated signal which has a bit length of 2n or sixteen and successively represents the groups of bits (AO, CO), (A1, C1), ..., (A15, C15), (DO, BO), and so on.

Figure 13:
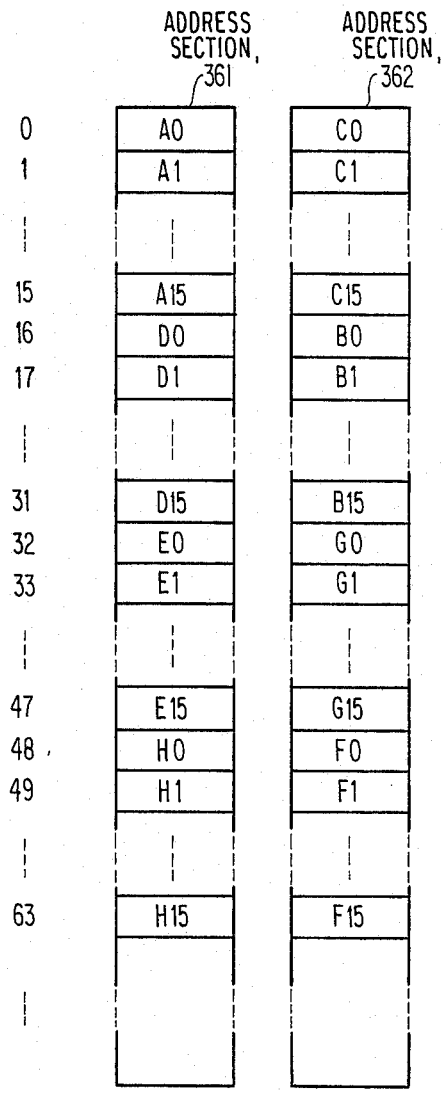
FIG. 13 shows picture element groups which are memorized in first and second address sections of a random access memory used in the device depicted in FIG. 9.

Turning back to FIG. 9 and referring to FIG. 13, the first rotated signal is delivered to first and second intermediate buffers 341 and 342 and thence to first and second address or memory sections 361 and 362 of the random access memory 36. Each address section 361 or 362 has addresses numbered in the manner described earlier and depicted in FIG. 13. Each address is for n or eight bits of the first rotated signal as before. While the first rotated signal is delivered to the random access memory 36, the address counter 37 counts up. The address sections 361 and 362 are put into the write-in mode of operation. The groups of bits are stored in the respective addresses are depicted in FIG. 13.

Being divided into two address sections 361 and 362, each address section 361 or 362 may have addresses, (MN/n)/2 in number. Counting up from zero to [(MN/n)/2−1], the address counter 37 is switched to make the address signal indicate the addresses in the manner which will shortly be described. The random access memory 36 is turned into the read-out mode.

Alternatively, the processed signal may have a bit length which is equal to the bit length of each shift register. The shift register arrays 331 and 332 may store a pair of blocks at a time. The pairs of blocks may be A and C, E and G, ..., B and D, F and H, and others.

Referring to FIGS. 9 and 14, the address signal simultaneously indicates a preselected number of addresses at a time as a set of addresses after the address counter 37 is switched. In the example illustrated in FIG. 14, the preselected number is equal to four or twice two, two for the first address section 361 and two others for the second address section 362. At time instants 1, 2, ..., (k+1), (k+2), ..., (16k+1), (16k+2), and so on, the sets of addresses are (0, 0, 32, 32), (64, 64, 96, 96), ..., (1, 1, 33, 33), (65, 65, 97, 97), ..., (16, 16, 48, 48), (80, 80, 112, 112), ... as shown in FIG. 14. In this manner, the address counter 37 is switched to have a count width which is equal to the bit length of the processed signal. Through the first and the second intermediate buffers 341 and 342, the first and second address sections 361 and 362 deliver first and second memory output signals to a data multiplexer 45.

In FIG. 9, the output data processing circuit 39 comprises an output multiplexer 46 and third and fourth output registers 48 and 49 in place of the output buffer 43 and in addition to the first and the second output registers 41 and 42. The output multiplexer 46 is controlled by the control s ignal and the timing signal to serve as the output buffer 43 and furthermore to produce the output signal in response to outputs of the first through the fourth output registers 41, 42, 48, and 49. The third and the fourth output registers 48 and 49 are controlled by the control and the timing signals like the first and the second output registers 41 and 42.

Referring to FIGS. 9, 15, and 16, the data multiplexer 45 is controlled by the timing signal to selectively deliver the first and the second memory output signals to the first through the fourth output registers 41, 42, 48, and 49. In FIG. 15, the first and the second memory output signals are indicated by RAM1 and RAM2 in a matrix fashion. The first through fourth columns of FIG. 15 show multiplexer output signals delivered to the first through the fourth output registers 41, 42, 48, and 49 at the respective time instants indicated along lines. It will be understood that the multiplexer output signals collectively correspond to the second rotated signal described earlier and depicted in FIG. 16 and that the output signal represents an output image which is congruent with the original image rotated by 90°.

When the control signal indicates a counterclockwise rotation of 270°, the image rotating device is operable in the manner described heretobefore to make the output signal represent an output image which is congruent with the original image rotated by 270°. When the control signal indicates a 180° rotation, the first through the fourth output registers 41, 42, 48, and 49 are rendered inoperative. Responsive to the processed signal, the output multiplexer 46 produces the output signal representative of an output image which is congruent with the original image rotated by 180°.

Reviewing FIG. 9, a combination of the random access memory 36, the address counter 37, and the data multiplexer 45 serves as a memory arrangement responsive to the timing signal for store the first rotated signal and for producing the second rotated signal. More particularly, the memory arrangement comprises the random access memory 36 having address sections, equal in number to the above-mentioned prescribed number. The address counter 37 is used at first to store the respective groups of bits in the address sections as stored groups. In cooperation with the data multiplexer 45, the address counter 37 is later used to read the stored groups out of the address sections to produce the second rotated signal. As is the case with the second rotated signal produced in the image rotating device illustrated with reference to FIG. 1, the second rotated signal successively represents sets of groups. Each set of groups consists of a preselected number of bits where the preselected number is equal to an integral multiple of the prescribed number. The image rotating device of FIG. 9 is operable to produce the output signal at a higher speed than the image rotating device illustrated with reference to FIG. 1.

Referring now to FIG. 17, description will proceed to an image rotating device according to a third embodiment of this invention. The image rotating device comprises similar parts which are designated again by like reference numerals. Supplied with a reducing input RDC in addition to the angle signal $\phi$ and the control input CNT, the controller 31 produces a reducing signal indicative of a reducing ratio at which the original image should be reduced in size to a reduced image. The reducing ratio may either be a one-dimensional or a two-dimensional ratio and may not necessarily be a linear ratio. The device is for processing the original image into an output image which is congruent with the reduced image rotated by the preselected angle. Stated otherwise, the output image corresponds to the original image rotated by the preselected angle. Unless the reducing input RDC is supplied, the controller 31 does not produce the reducing signal. In this case, the device is operable like the image rotating device described with reference to FIG. 1 or 9.

In FIG. 17, the input data processing circuit 32 comprises a reducing circuit 51 controlled by the reducing signal to deliver a reduced signal representative of the reduced image to an input multiplexer 52. In this event, a bus 53 is put out of operation. When the reducing signal is not produced, the reducing circuit 51 is put into an inoperative state. Instead, the bus 53 delivers the input signal directly to the input multiplexer 52. Controlled by the control signal and the timing signal, the input multiplexer 52 delivers the processed signal to the first and the second shift register arrays 331 and 332 and to the output multiplexer 46 in the manner described in conjunction with FIG. 9. Irrespective of production of the reducing signal, each block of the processed signal will be said to consist of words, equal in number to the first predetermined number n. Each word will be said to consist of bits, equal in number to the second predetermined number m.

Turnign to FIGS. 18 and 19, it will be supposed that the reducing input RDC indicates subsampling of one bit from each square of four bits of the input signal and that each block of the original image consists of sixteen thirty-two-bit words. The sixteen words are now indicated by numerals 0 through 15 as depicted in FIG. 18 together with a first set of simplified notations for the respective column parts of the original image. Each block of the reduced image consists of eight sixteen-bit words in the manner exemplified in FIG. 19. For the subsampling, the reducing signal may indicate the bits and the lines which should be selected from each line of bits and from each block. Alternatively, the above-described frame memory or central processing unit may be used in producing the reduced signal instead of the reducing circuit 51.

The blocks of the processed signal are set in the first and the second shift register arrays 331 and 332 from time to time in the manner exemplified before in conjunction with FIG. 12. The random access memory 36 has the first and the second address sections 361 and 362 and is used as described above.

Turning to FIG. 20, it will be surmised that the control signal indicates the counterclockwise rotation of 90°. Each block of the processed signal is set in one of the shift register arrays 331 and 332 in the manner exemplified in the figure. A second set of simplified notations are shown to represent the groups of bits like those described in connection with FIGS. 10 and 11.

Further turning to FIGS. 21 through 23, the original image is depicted in FIG. 21 by the first set of simplified notations. The reduced image is illustrated in FIG. 22 with the second set of simplified notations. The output image is shown in FIG. 23 with the second set of simplified notations.

Finally referring to FIGS. 17 and 24, the groups of bits are stored in the first and the second address sections 361 and 362 of the random access memory 36 in the manner described earlier and depicted in FIG. 24. After being switched, the address counter 37 makes the address signal indicate the addresses as described in connection with FIG. 14. The data multiplexer 45 is controlled by the timing signal as described in conjunction with FIG. 15. It will now be clear that the output multiplexer 46 produces the output signal representative of the output image with the reduced image given a rotation of one of 90°, 180°, and 270° that is indicated by the angle signal $\phi$.

While this invention has thus far been described in specific conjunction with a few preferred embodiments thereof, it will now be readily possible for one skilled in the art to put this invention into effect in various other manners. Above all, it should be appreciated that the original image may be a multilevel image. Even in this event, the picture elements of the original image are represented by bits of the input signal. The numbers M and N need not be integral multiples of the first and the second predetermined numbers. The random access memory 36 may have addresses which are less in total than MN/n. The reducing ratio may not necessarily be greater than unity. In other words, it is possible to use the "reducing" circuit 51 to enlarge the original image with the number of picture elements adjusted as by linear or nonlinear interpolation.

It will readily be possible to implement and modify various parts used in the image rotating device so far described. For example, the input data processing circuit 32 can be modified together with the output registers, such as 41 and 42, so as to rearrange the words of the original or the reduced image when the control signal indicates the 270° rotation. The input data processing circuit 32 can be modified together with the output buffer 43 so as to differently rearrange the words when the control signal indicates the 180° rotation.

What is claimed is:

1. A device responsive to an angle signal indicative of a preselected angle selected from 90°, 180°, and 270° for processing an input signal representative of an original image into an output signal representative of an output image which corresponds to the original image rotated by said preselected angle, said device comprising:

a controller responsive to said angle signal for producing a control signal and a timing signal;

an input data processing circuit responsive to said control and said timing signals for processing said input signal into a processed signal;

shift register means responsive to said timing signal for shifting said processed signal to produce a first rotated signal;

memory means responsive to said timing signal for memorizing said first rotated signal and for producing a second rotated signal; and an output data processing circuit responsive to said control and said timing signals for processing one of said processed signal and said second rotated signal into said output signal, output signal being said second rotated signal when said preselected angle is one of 90° and 270°, said output signal being said processed signal when said preselected angle is 180°.

2. A device as claimed in claim 1, said original image being divisible into a plurality of blocks, each consisting of a first predetermined number of words, each word consisting of a second predetermined number of picture elements, wherein:

said input data processing circuit outputs said processed signal as a sequence of blocks representative of respective blocks of said original image;

said shift register means comprises a shift register array for memorizing each block of said processed signal at a time to produce said first rotated signal with said first rotated signal successively representing groups of bits, the bits of each group being equal in number to said second predetermined number; and said memory means has a plurality of addresses for memorizing the respective groups of bits and for producing said second rotated signal with said second rotated signal successively representing sets of groups, each set of groups consisting of a preselected number of groups.

3. A device as claimed in claim 1, said original image being divisible into a plurality of blocks, each consisting of a first predetermined number of words, each word consisting of a second predetermined number of picture elements, wherein:

said input data processing circuit outputs said processed signal as a sequence of blocks representative of the respective blocks of said original image;

said shift register means comprises a prescribed number of shift register arrays for memorizing a plurality of blocks of said processed signal at a time, respectively, to produce said first rotated signal with said first rotated signal made to successively represent groups of bits, the bits of each group being equal in number to said second predetermined number; and said memory means comprises:

a random access memory having address sections, equal in number to said prescribed number;

storing means for storing the respective groups of bits in said address sections as stored groups; and reading means for reading said stored groups to produce said second rotated signal with said second rotated signal made to successively represent sets of groups, each set of groups consisting of a preselected number of groups, said preselected number being an integral multiple of said prescribed number.

4. A device as claimed in claim 1, said controller being furthermore responsive to a reducing input for producing a reducing signal indicative of a reducing ratio at which said original image is reduced in size to a reduced image, said device producing the output signal representative of the output image which is congruent with the reduced image rotated by said preselected angle, wherein said input data processing circuit comprises:

a reducing circuit responsive to said reducing signal for processing said input signal into a reduced signal representative of said reduced image; and an input multiplexer responsive to said control and said timing signals for processing said reduced signal into said processed signal.

5. A device as claimed in claim 1, wherein said output data processing circuit comprises an output buffer and first and second output registers, said output buffer receiving said processed signal, said first and second output registers together receiving said second rotated signal.

6. A device as claied in claim 1, wherein, when said preselected angle is one of 180° and 270°, said processed signal comprises said input signal in bit-reversed order.

* * * * *

UNITED STATES PATENT AND TRADEMARK OFFICE
CERTIFICATE OF CORRECTION

PATENT NO. : 4,806,920
DATED : February 21, 1989
INVENTOR(S) : Hachiro SAWADA

It is certified that error appears in the above-identified patent and that said Letters Patent is hereby corrected as shown below:

COLUMN 4, LINE 45   Delete "beig" and insert therefor --being--.

COLUMN 5, LINE 39   Delete "signal°" and insert therefor --signal $\varphi$--.

COLUMN 7, LINE 19   Delete "s ignal" and insert therefor --signal--.

COLUMN 7, LINE 55   Delete "store" and insert therefor --storing--.

COLUMN 8, LINE 45   Delete "Turnign" and insert therefor --Turning--.

COLUMN 10, LINE 4   After "output signal," insert --said--.

COLUMN 12, LINE 5   Delete "claied" and insert therefor --claimed--.

Signed and Sealed this

Thirty-first Day of October, 1989

Attest:

DONALD J. QUIGG

*Attesting Officer*   *Commissioner of Patents and Trademarks*